（12）United States Patent
Davis

(10) Patent No.: US 10,108,408 B2
(45) Date of Patent: Oct. 23, 2018

(54) CONVERTING DESKTOP APPLICATIONS INTO CLOUD SERVICES

(71) Applicant: VMware, Inc., Palo Alto, CA (US)

(72) Inventor: Scott Howard Davis, Needham, MA (US)

(73) Assignee: VMware, Inc., Palo Alto, CA (US)

( * ) Notice: Subject to any disclaimer, the term of this patent is extended or adjusted under 35 U.S.C. 154(b) by 303 days.

(21) Appl. No.: 14/455,713

(22) Filed: Aug. 8, 2014

(65) Prior Publication Data

US 2015/0378704 A1    Dec. 31, 2015

Related U.S. Application Data

(60) Provisional application No. 62/017,426, filed on Jun. 26, 2014.

(51) Int. Cl.
| | |
|---|---|
| G06F 9/445 | (2018.01) |
| G06F 8/60 | (2018.01) |
| H04L 29/08 | (2006.01) |
| G06F 9/48 | (2006.01) |
| G06F 8/61 | (2018.01) |
| G06F 9/451 | (2018.01) |

(52) U.S. Cl.
CPC .............. G06F 8/60 (2013.01); G06F 9/4856 (2013.01); H04L 67/10 (2013.01); H04L 67/16 (2013.01); *G06F 8/61* (2013.01); *G06F 9/452* (2018.02)

(58) Field of Classification Search
CPC ......... G06F 17/30174; G06F 17/30082; G06F 17/30194; G06F 17/30575; G06F 9/45533
See application file for complete search history.

(56) References Cited

U.S. PATENT DOCUMENTS

| | | | |
|---|---|---|---|
| 6,378,127 B1* | 4/2002 | Delo ......................... | G06F 8/41 717/143 |
| 6,438,749 B1* | 8/2002 | Chamberlain ............ | G06F 8/62 714/15 |
| 7,953,833 B2 | 5/2011 | Ben-Shaul et al. | |
| 8,112,505 B1 | 2/2012 | Ben-Shaul et al. | |
| 8,489,719 B2 | 7/2013 | Ben-Shaul et al. | |
| 8,626,723 B2 | 1/2014 | Ben-Shaul et al. | |

(Continued)

FOREIGN PATENT DOCUMENTS

WO      2009027474 A2      5/2009

OTHER PUBLICATIONS

K. Thomas, 10 Cool Things Virtualization Lets You Do, published Feb. 25, PC World, downloaded from http://www.pcworld.com/article/220644/10_Cool_Things_Virtualization_Lets_You_Do.html.*

(Continued)

*Primary Examiner* — Jennifer To
*Assistant Examiner* — Eric Yoon
(74) *Attorney, Agent, or Firm* — Fish & Richardson P.C.

(57) ABSTRACT

Techniques for converting desktop applications into cloud services are provided. In one embodiment, a server system can receive a representation of an application that has been extracted from an installation of the application on an end-user computing device. The representation can include a collection of files and configuration information associated with the application. The server system can then store the representation of the application in a server-side repository for deployment as a cloud service.

26 Claims, 6 Drawing Sheets

(56) References Cited

U.S. PATENT DOCUMENTS

| | | | |
|---|---|---|---|
| 8,639,917 B1 | 1/2014 | Ben-Shaul et al. | |
| 9,021,581 B1* | 4/2015 | Bezalel | G06F 9/455 |
| | | | 726/21 |
| 9,317,457 B2* | 4/2016 | Reeves | G06F 13/14 |
| 2002/0066085 A1* | 5/2002 | Nowlin, Jr. | G06F 8/20 |
| | | | 717/137 |
| 2004/0107368 A1* | 6/2004 | Colvin | G06F 21/121 |
| | | | 726/30 |
| 2005/0193032 A1* | 9/2005 | Barritz | G06F 9/4451 |
| 2009/0228629 A1* | 9/2009 | Gebhart | G06F 8/63 |
| | | | 711/6 |
| 2010/0037218 A1* | 2/2010 | Romm | G06F 9/44505 |
| | | | 717/174 |
| 2012/0311564 A1 | 12/2012 | Khalid | |

OTHER PUBLICATIONS

B. Madden, "8 reasons why Windows 8 on a tablet won't fix our legacy Windows desktop apps problem," BrianMadden.com, published Oct. 15, 2012, downloaded at http://www.brianmadden.com/opinion/8-reasons-why-Windows-8-on-a-tablet-wont-fix-our-legacy-Windows-desktop-apps-problem.*

M. Tulloch, "Locating an Application's Registry Settings," published on Sep. 27, 2006, downloaded at <http://www.windowsnetworking.com/kbase/WindowsTips/WindowsXP/RegistryTips/Miscellaneous/LocatinganApplicationsRegistrySettings.html>.*

How-To Geek, "Why You Can't Just Copy a Program's Folder to a New Windows System and When You Can," published Apr. 19, 2014 as confirmed by waybackmachine.org, downloaded from http://www.howtogeek.com/172701/why-you-cant-just-copy-a-programs-folder-to-a-new-windows-system-and-when-you-can/.*

"8 Tools to Track Registry and File Changes by Comparing Before and After Snapshots," published around Oct. 2012, downloaded from https://www.raymond.cc/blog/tracking-registry-and-files-changes-when-installing-software-in-windows/.*

International Search Report and Written Opinion—PCT/US2015/037276—ISA/EPO—dated Sep. 10, 2015.

U.S. Appl. No. 12/945,507, filed Nov. 12, 2010 and entitled "Mass Migration of Desktop Deployments to Virtual Desktop Infrastructures".

U.S. Appl. No. 13/732,306, filed Dec. 31, 2012 and entitled "N-Way Synchronization of Desktop Images".

U.S. Appl. No. 13/732,312, filed Dec. 31, 2012 and entitled "Fast Provisioning of a Centralized Virtual Desktop Using Linked Clones".

U.S. Appl. No. 13/732,317, filed Dec. 31, 2012 and entitled "Device Dependent Rules for Synchronizing Desktop Images and Managing Hardware Dependencies".

U.S. Appl. No. 13/732,320, filed Dec. 31, 2012 and entitled "Independent Synchronization of Virtual Desktop Image Layers".

U.S. Appl. No. 14/169,021, filed Jan. 30. 2014 and entitled "Remote Contextual Access to Operating System Desktops".

U.S. Appl. No. 14/169,016, filed Jan. 30, 2014 and entitled "Merging of Desktop Images".

* cited by examiner

CONVERTING DESKTOP APPLICATIONS INTO CLOUD SERVICES

CROSS-REFERENCE TO RELATED APPLICATIONS

This application claims priority to U.S. Provisional Patent Application No. 62/017,426, filed Jun. 26, 2014, entitled "Converting Desktop Applications into Cloud Services," which is incorporated by reference in its entirety for all purposes.

BACKGROUND

In recent years, web-centric operating systems (OSs) such as Google's CHROME OS have become a popular alternative to traditional desktop OSs such as Microsoft WINDOWS, MAC OS, and the like. Computing devices that run a web-centric OS are typically cheaper and easier to manage than desktop OS-based PCs or laptops. This is due, in part, to the fact that web-centric OS devices are largely stateless (i.e., most, if not all, of their data and applications are maintained/executed in the cloud) whereas desktop OS devices are stateful (i.e., such devices store/run a large proportion of their data/applications locally). As a result, web-centric OS devices are particularly attractive for medium to large-sized organizations (e.g., enterprises, school districts, etc.), since such organizations can significantly reduce the total cost of ownership of their end-user computing deployments by transitioning users to such devices.

One challenge with transitioning a user from an old computing device to a new computing device is that the new computing device may not support some of the user's desktop applications that are available on the old computing device. For instance, the new computing device may have a processor with a different architecture that cannot run the user's old desktop applications. Alternatively or in addition, the new computing device may have a new OS (e.g., CHROME OS) that is different from, or otherwise incompatible with, the OS running on the old computing device (e.g., WINDOWS). By way of example, consider an employee that uses a WINDOWS based laptop to, among other things, access an important work-related application that is only available on the WINDOWS platform. In this scenario, the employee would be unable to replace his/her WINDOWS based laptop with, e.g., a CHROMEBOOK, smartphone, or tablet device (e.g., an iPad or ANDROID based tablet), since he/she would no longer be able to use the application on the new device. As a workaround, the employee could keep the WINDOWS-based laptop, in addition to the CHROMEBOOK/smartphone/tablet, for the sole purpose of maintaining access to the application. However, this approach is cumbersome and negates many of the benefits of transitioning to a new device.

SUMMARY

Techniques for converting desktop applications into cloud services are provided. In one embodiment, a server system can receive a representation of an application that has been extracted from an installation of the application on an end-user computing device. The representation can include a collection of files and configuration information associated with the application. The server system can then store the representation of the application in a server-side repository for deployment as a cloud service.

At a subsequent point in time, the server system (or another server system in the same cloud infrastructure) can receive, from a remote access client running on a second end-user computing device distinct from the first end-user computing device, a request to access the application as a cloud service. In response, the server system can retrieve the representation of the application from the server-side repository; deploy, using the retrieved representation, an instance of the application on a server-side OS instance; and cause the user interface (UI) of the deployed application instance to be delivered, via an appropriate remote display protocol, to the remote access client.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure describes a framework for converting a desktop application that is installed on an end-user computing device into a "cloud service"—in other words, a software service that is hosted on one or more servers and provided, on-demand, to one or more clients. At a high level, the framework includes two workflows: (1) a first workflow for extracting the desktop application from the computing device as a self-contained "application layer" and storing the application layer, with appropriate metadata, in a server-side repository; and (2) a second workflow for automatically deploying (in response to, e.g., a user request received via a second computing device) the stored application layer to a server-side OS instance so that the requesting user can access the deployed application via a remote access client running on the second computing device.

In certain embodiments, the computing device from which the desktop application is extracted in workflow (1) may run a first OS, and the computing device from which the desktop application is remotely accessed in workflow (2) may run a second OS that is different from the first OS (or is otherwise incompatible with the first OS). For instance, the first computing device may be desktop OS (e.g., WINDOWS) based PC or laptop, and the second computing device may be a web-centric OS (e.g., CHROME OS) based device. Alternatively, the first computing device may have a processor with a first architecture (e.g., x86), and the second computing device may have a processor with a second architecture (e.g., ARM) that is different from the first architecture (or otherwise incompatible with the first architecture). In these and other similar scenarios, the framework described herein advantageously allows desktop applications installed on the first computing device to be made accessible via the second computing device, regardless of whether those applications are natively supported by the second OS (or second processor architecture) on the second device.

Figure 1:
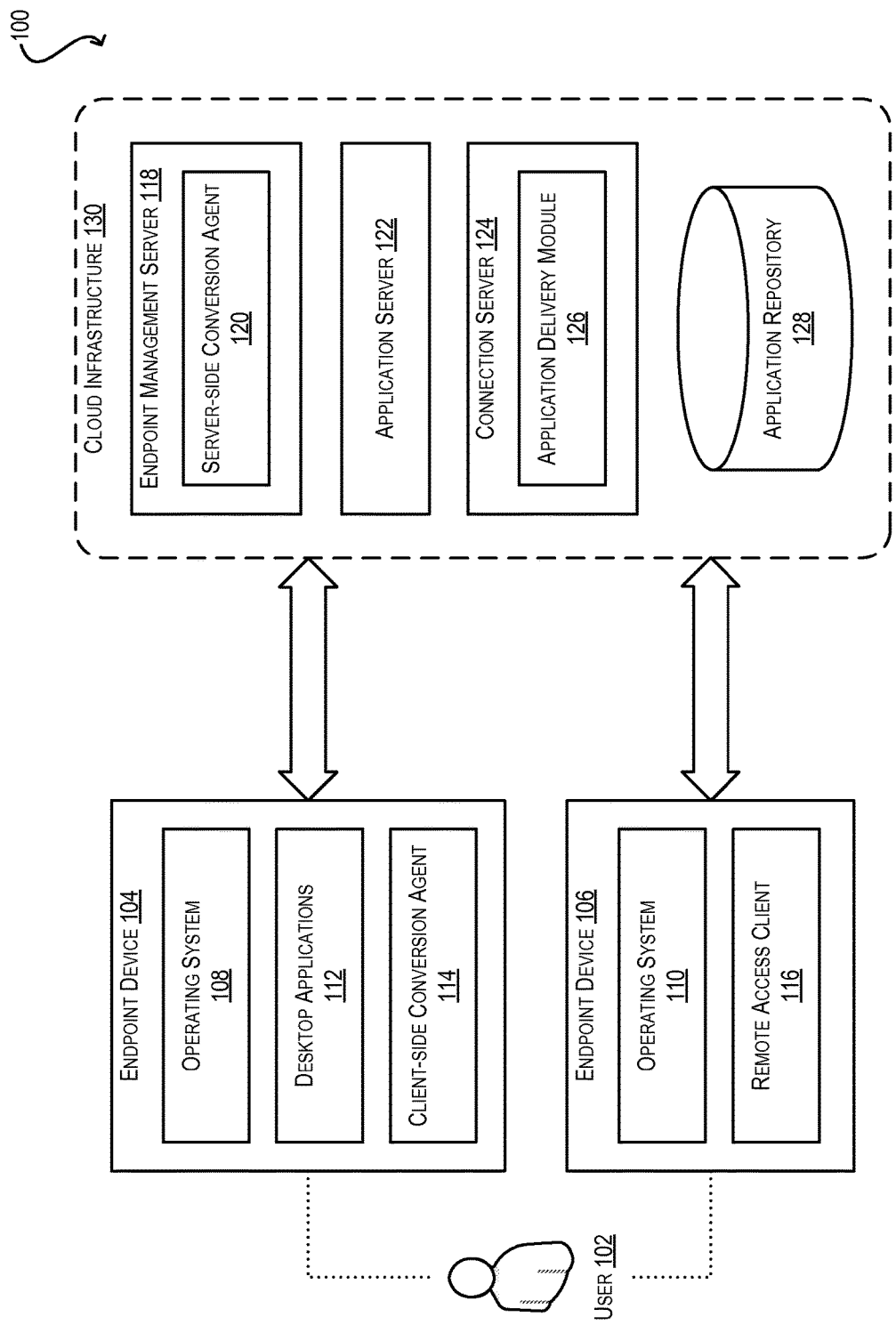
FIG. 1 depicts a system environment for converting desktop applications into cloud services according to an embodiment.

FIG. 1 depicts a system environment 100 that supports the conversion of desktop applications into cloud services according to an embodiment. As shown, system environment 100 includes a user 102 that is associated with two end-user computing devices 104 and 106 (referred to as "endpoint devices"). Each endpoint device 104/106 is configured to run a client OS 108/110, such as Microsoft WINDOWS, MAC OS, CHROME OS, or the like. In one embodiment, endpoint device 106 may be a stateless device, such as a thin/zero client, a browser kiosk, a tablet device, etc. Further, endpoint device 104 is configured to run a number of desktop applications 112 that are native to OS 108. Examples of such desktop applications include document processing applications, information access/management applications, media playback applications, and so on. Desktop applications 112 are installed on top of OS 108, such that OS 108 is aware of their presence and can manage certain aspects of their configuration/operation (e.g., registry entries, configuration files, shared libraries, etc.).

Assume that endpoint device 104 is an "old" device and endpoint device 106 is a "new" device that user 102 wishes to use as a replacement for endpoint device 104 (due to, e.g., personal preference, a deployment of new devices within user 102's organization, or other reasons). Further assume that OS 110 of new endpoint device 106 is different from (or otherwise incompatible with) OS 108 of old endpoint device 104 (alternatively, endpoint devices 104 and 106 may run the same OS but may have processors with different/incompatible architectures). As noted the Background section, in this scenario, some (or all) of desktop applications 112 may not be transferrable from old endpoint device 104 to new endpoint device 106 because native versions of those applications may not be available for new endpoint device 106. This, in turn, may discourage user 102 from following through with the device transition despite potential benefits (e.g., lower cost, reduced management burden, etc.), or may result in awkward workarounds (e.g., keeping both old and new devices).

To address the foregoing and other similar issues, system environment 100 implements a novel application conversion framework that includes a client-side conversion agent 114 (executing on old endpoint device 104), a remote access client 116 (executing on new endpoint device 106), an endpoint management server 118 comprising a server-side conversion agent 120, an application server 122, a connection server comprising an application delivery module 126, and an application repository 128. In the example of FIG. 1, endpoint management server 118, application server 122, connection server 124, and application repository 128 are part of a common cloud infrastructure 130 that is communicatively coupled with endpoint devices 104 and 106 via one or more networks (not shown). As described in further detail below, components 114-128 can work in concert to convert desktop applications 112 into cloud services, thereby allowing the functionality of applications 112 to be made available on-demand to user 102 from new endpoint device 106, regardless of OS or processor incompatibilities.

Figure 2:
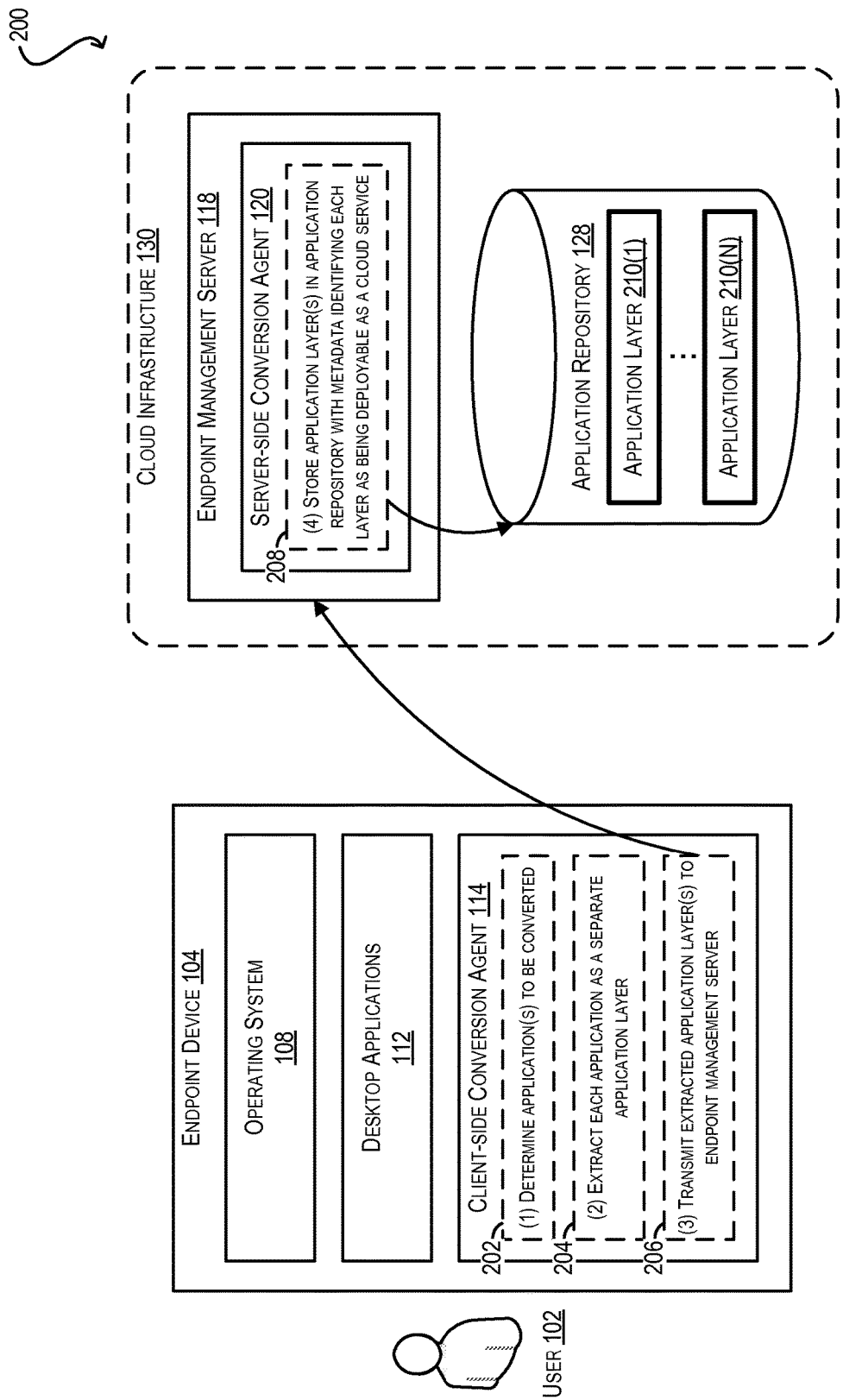
FIG. 2 depicts a first workflow within the system environment of FIG. 1 according to an embodiment.

FIG. 2 depicts an example workflow 200 that can be performed by client-side conversion agent 114 of old endpoint device 104 and server-side conversion agent 120 of endpoint management server 118 for exporting desktop applications 112 to cloud infrastructure 130 in preparation for deploying applications 112 as cloud services. In one embodiment, client-side conversion agent 114 can be implemented as part of an existing IT endpoint management tool, such as VMware's HORIZON or MIRAGE clients.

At step (1) of workflow 200 (reference numeral 202), client-side conversion agent 114 can first determine which desktop applications installed on old endpoint device 104 should be converted into cloud services. In one embodiment, this step can comprise presenting a UI to user 102 that enables the user to select one or more of desktop applications 112. In an alternative embodiment, this step can comprise consulting a list of applications that have been pre-selected by, e.g., an administrator of old endpoint device 104 for conversion.

At step (2) (reference numeral 204), client-side conversion agent 114 can extract each selected application as a separate application layer. As used herein, an "application layer" is a self-contained representation of a desktop application that includes, e.g., a collection of the files that make up the application, as well as application configuration information. For example, in embodiments where OS 108 of old endpoint device 104 makes use of an application registry (like Microsoft WINDOWS), the configuration information can comprise a transactional representation of registry entries for the application (such as an ordered series of create, update, and delete registry operations).

In a particular embodiment, during the initial installation of the application, client-side conversion agent 114 can record the various processes and operations performed on the endpoint device during the installation. For example, client-side conversion agent 114 can record an indication of the directories and files that are created as part of the installation process, as well as the operations performed on the OS registry. Then, at the time of extracting the application as an application layer, client-side conversion agent 114 can use this recorded information to identify the files/data for the application that should be packaged into the layer. Once created, the application layer can be applied to another device (e.g., a server in a data center) having a compatible operating system and other requirements to reproduce the application and all of its custom configuration on that other device. For instance, the recorded ordered series of create, update and delete registry operations in the application can be "re-played" on a virtual machine on a server in a data center in order to deploy the application as a cloud service.

Once the applications have been extracted as separate application layers, client-side conversion agent 114 can transmit each layer to endpoint management server 118 (step (3); reference numeral 206). In a particular embodiment, this transmission can be performed using conventional network deduplication techniques to minimize the amount of network bandwidth required. Then, at step (4) (reference numeral 208), server-side conversion agent 120 of endpoint management server 118 can process the application layers received from client-side conversion agent 114 and can store each layer in application repository 128 (shown as stored layers 210(1)-210(N)). Similar to step (3), step (4) can be performed using conventional storage deduplication techniques to minimize the amount of storage space required within repository 128.

As part of step (4), server-side conversion agent 120 can persist metadata indicating that the desktop applications represented by stored application layers 210(1)-210(N) may be delivered as cloud services to user 102. This metadata can be represented in a number of different ways, such as one or more flags or values associated with each application layer. Alternatively or in addition, server-side conversion agent 120 can add an identifier for each desktop application (e.g., app ID or name) to a cloud-accessible "user workspace" defined for user 102 (discussed with respect to FIG. 5 below). Thus, when user 102 subsequently attempts to access a particular desktop application as a cloud service, the server platform of cloud infrastructure 130 can know that the application originated from an endpoint device owned by user 102 and should be made available to the user.

Figure 3:
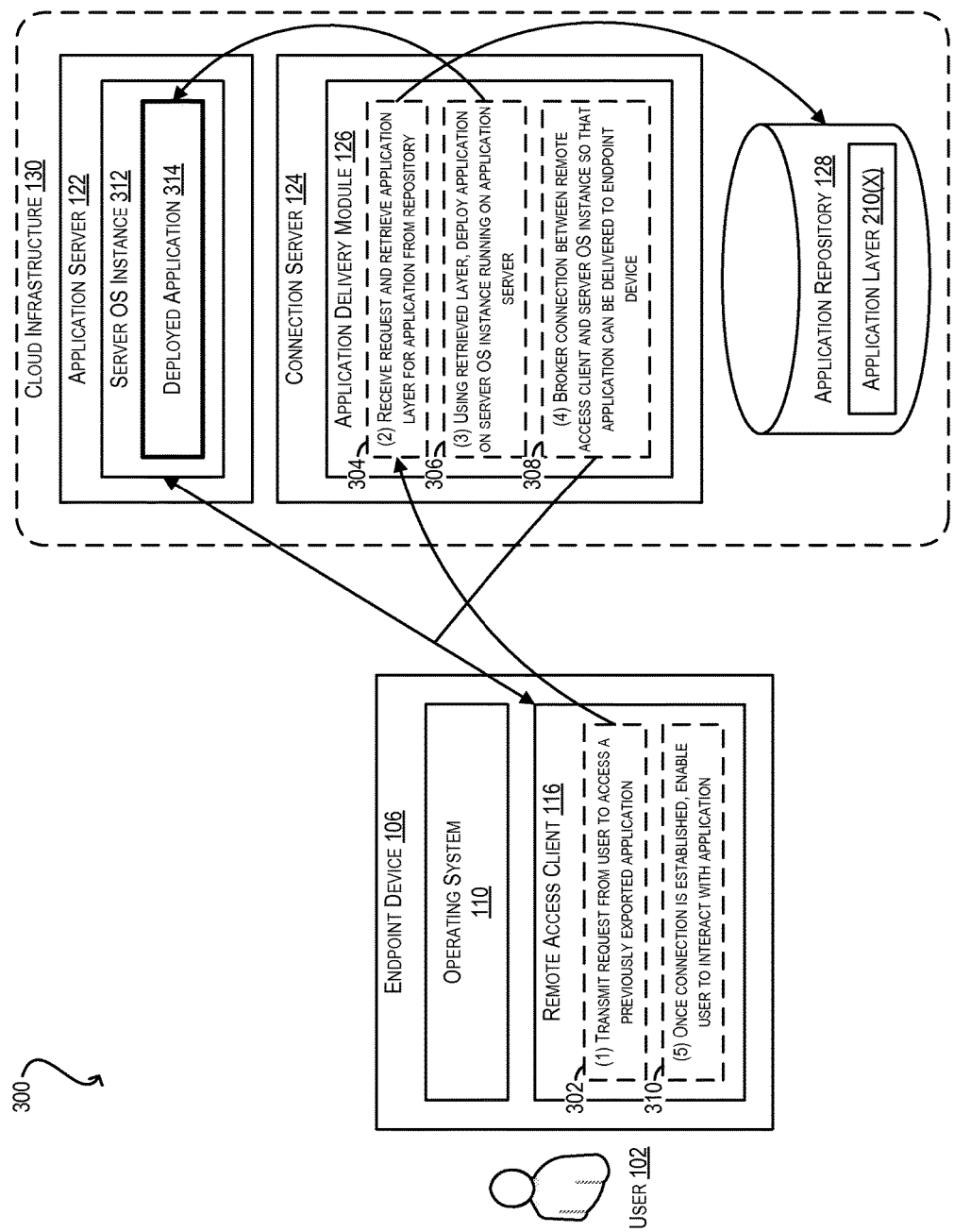
FIG. 3 depicts a second workflow within the system environment of FIG. 1 according to an embodiment.

FIG. 3 depicts an example workflow 300 that can be performed by remote access client 116 of new endpoint device 106 and application delivery module 126 of connection server 124 for enabling user 102 to access (via new device 106) a particular desktop application 112 that has been exported per workflow 200 of FIG. 2. Generally speaking, remote access client 116 can be any type of software program that supports a remote display protocol for remoting the UI of a user desktop and/or an individual desktop application from a server to a client device. For example, in a particular embodiment, remote access client 116 can be a web-based client (e.g., a web browser plugin) that supports an HTML5-based remote display protocol such as VMware's Blast protocol. In other embodiments, remote access client 116 can be, e.g., a standalone client, and/or make use of other remote display protocols (e.g., Microsoft's RDP, VMware's PCoIP, etc.). Connection server 124 (and the other entities of cloud infrastructure 130) can be part of an IT-maintained data center or a Desktop as a Service (DaaS) platform hosted by a third-party cloud service provider.

At step (1) of workflow 300 (reference numeral 302), remote access client 116 can receive a request from user 102 to access a previously exported desktop application 112 and can forward the request to connection server 124.

In response, application delivery module 126 of connection server 124 can receive the request, optionally authenticate user 102 (if he/she has not already been authenticated), and retrieve the stored application layer for the application (e.g., layer 210(X)) from application repository 128 (step (2); reference numeral 304).

At step (3) (reference numeral 306), application delivery module 126 can use the retrieved application layer to deploy application 112 on a server OS instance 312 resident on application server 122. It is assumed that server OS instance 312 is compatible with OS 108 of old endpoint device 104. This deployment step can comprise installing application 112 on the server OS instance (if it is not already installed) and applying the configuration information included in the application layer for the application. For example, in embodiments where the configuration information includes a transaction representation of registry entries, the deployment step can include replaying the ordered series of create, update, and delete registry operations in the transactional representation in order to replicate, on server OS instance 312, the configuration of the application as it existed on old endpoint device 104. In one set of embodiments, server OS instance 312 can run within a persistent or non-persistent virtual machine (VM) hosted by application server 122 (as in a virtual desktop infrastructure (VDI) or DaaS deployment). In these embodiments, server OS instance 312 can be configured for use by a single user at a time (e.g., user 102).

In alternative embodiments, server OS instance 312 can run directly on the physical hardware of application server 122 and can support session virtualization (as in a remote desktop services host (RDSH) deployment). In these embodiments, server OS instance 312 can be shared (i.e., time-sliced) by multiple users/sessions simultaneously.

Once desktop application 112 has been deployed per step (3) (shown as deployed application 314), application delivery module 126 can broker a connection between remote access client 116 and server OS instance 312 so that deployed application 314 can be delivered to new endpoint device 106 (step (4); reference numeral 308). This step can comprise, e.g., establishing a communication tunnel between remote access client 116 and a remoting agent within service OS instance 312 according to a mutually understood remote display protocol (e.g., Blast).

Finally, at step (5) (reference numeral 310), remote access client 116 can present the UI for deployed application 314 to user 102, thereby enabling user 102 to interact with the application via new endpoint device 106. For example, the remote access client 116 can receive the display information (e.g., framebuffer data) of the UI of the application generated by the deployed application 314 over the communication tunnel and cause the display information to be displayed on the endpoint device 106 to the end user 102. In addition, the remote access client 116 can detect any user input events (e.g., mouse clicks, keyboard events, touch input, etc.) and forward the user input events to the deployed application 314. In turn, the deployed application 314, may update its UI based on the user input events received from the remote access client and forward any changes of its UI to the remote access client 116 via the remote display protocol.

It should be appreciated that FIGS. 1-3 are illustrative and not intended to limit the scope of the present disclosure. For example, although endpoint management server 118, application server 122, and connection server 124 are shown as distinct entities in FIG. 1, in some embodiments the functions attributed to these servers may be intermingled or performed by a single physical machine. Further, although FIGS. 2 and 3 depict particular workflow steps, steps described as sequential may be executed in parallel, the order of steps may be varied, and certain steps may be modified, combined, added, or omitted. One of ordinary skill in the art will recognize many variations, modifications, and alternatives.

The remaining portions of this disclosure provide flowcharts of the processing attributed to client-side conversion agent 114, server-side conversion agent 120, remote access client 116, and application delivery module 126 in FIGS. 1-3. Like FIGS. 1-3, these flowcharts are meant to be exemplary and non-limiting.

Figure 4:
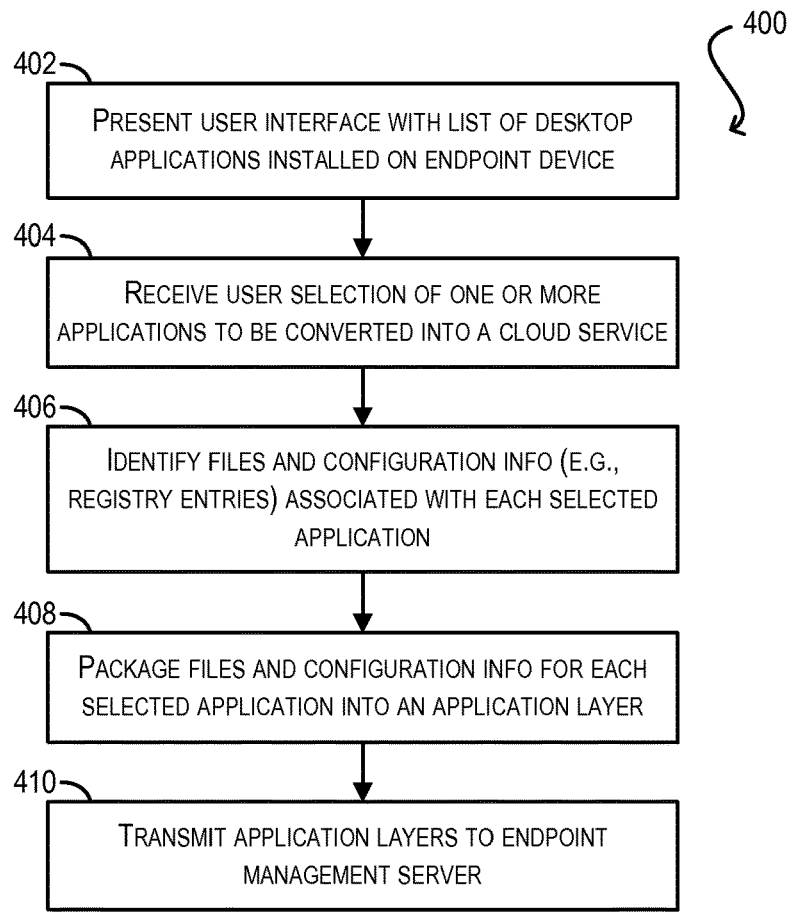
FIG. 4 depicts a flowchart performed by a client-side conversion agent according to an embodiment.
Figure 5:
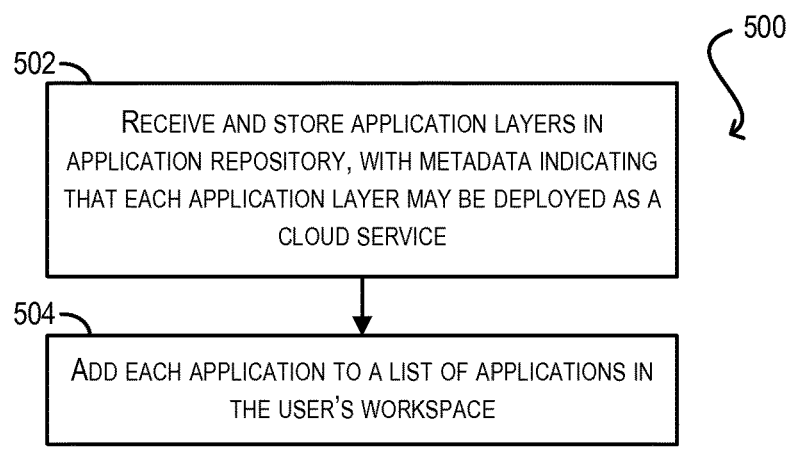
FIG. 5 depicts a flowchart performed by a server-side conversion agent according to an embodiment.

For instance, FIGS. 4 and 5 depict flowcharts 400 and 500 that may be performed by agents 114 and 120 respectively as part of workflow 200 of FIG. 2 (i.e., the application export workflow) according to an embodiment.

Starting with FIG. 4, at block 402, client-side conversion agent 114 can present a UI to user 102 with a list of desktop applications that are available on old endpoint device 104 for conversion into a cloud service. In one embodiment, this list may include all applications 112 that are installed on old endpoint device 104. In other embodiments, this list may exclude one or more installed applications based on, e.g., a blacklist or whitelist defined by an administrator.

At block 404, client-side conversion agent 114 can receive a user selection of one or more applications in response to the UI presented at block 402.

At block 406, client-side conversion agent 114 can identify the files and configuration information (e.g., registry entries) associated with each selected application. Client-side conversion agent 114 can then package the files and configuration information for each application into an application layer (block 408), thereby creating a self-contained representation of the application.

Finally, at block 410, client-side conversion agent 114 can transmit the layers to endpoint management server 118 for further handling.

Turning now to FIG. 5, at block 502, server-side conversion agent 120 can receive the application layers sent by client-side conversion agent 114 at block 410 and can store the layers in application repository 128. As part of this storage step, server-side conversion agent 120 can persist metadata indicating that each stored application layer may be deployed as a cloud service.

Server-side conversion agent 120 can also add an identifier for each application (e.g., app ID or name) to a cloud-accessible user workspace associated with user 102 (block 504). In this way, the cloud-accessible versions of these applications may be associated with (and thus later accessed by) user 102.

Figure 6:
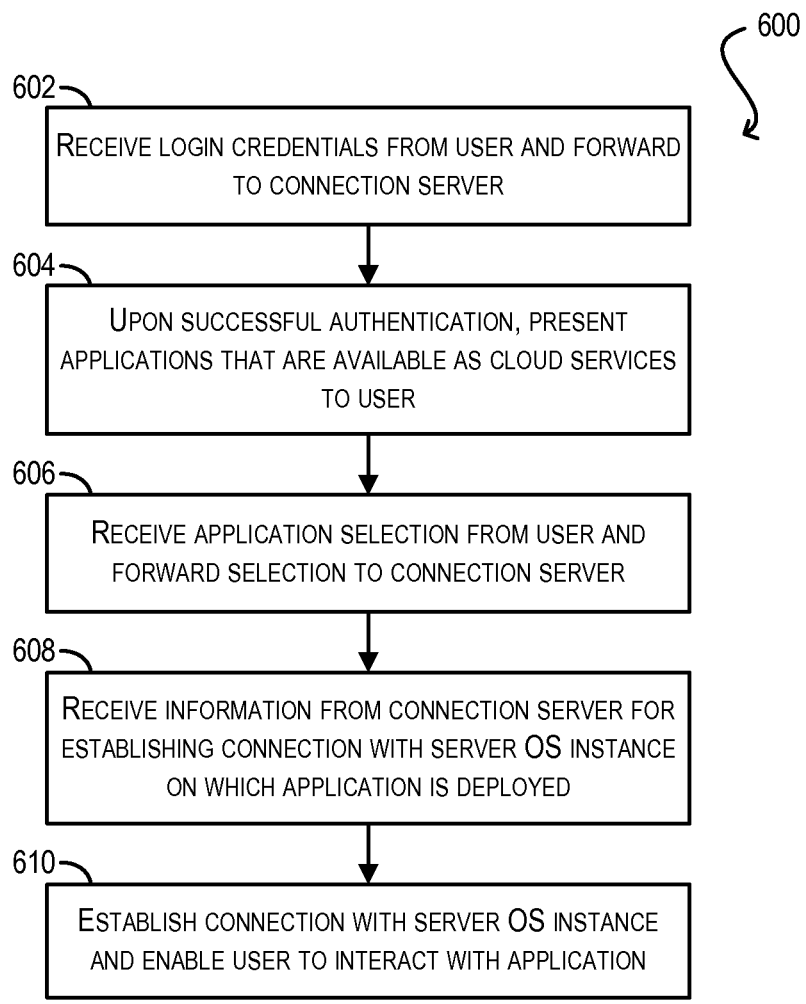
FIG. 6 depicts a flowchart performed by a remote access client according to an embodiment.

FIG. 6 depicts a flowchart 600 that may be performed by remote access client 116 of new endpoint device 106 as part of workflow 300 of FIG. 3 (i.e., the cloud service access workflow) according to an embodiment. Flowchart 600 assumes that one or more of user 102's desktop applications have been exported from old endpoint device 104 to application repository 128 per flowcharts 400 and 500.

At block 602, remote access client 116 can receive login credentials from user 102 for accessing his/her cloud workspace and forward the credentials to connection server 124. The login credentials can include, e.g., a user identifier and security metadata associated with the user. Assuming the authentication is successful, remote access client 116 can receive a list of applications that are available as cloud services to user 102, and can present this list in an appropriate UI (e.g., an application portal page) to the user (block 604). The list can include one or more of the applications exported from old endpoint device 104 in FIGS. 4 and 5.

At block 606, remote access client 116 can receive, from user 102, a selection of a particular application in the list presented at block 604 and can forward the selection to connection server 124. As noted with respect to FIG. 3, this can cause application delivery module 126 of connection server 124 to deploy the application on a server OS instance (i.e., 312) running on a selected application server (i.e., 122).

Once the application has been deployed, remote access client 116 can receive information from application delivery module 126 for establishing a connection with a remoting agent within server OS instance 312 via a remote display protocol (block 608). Remote access client 116 can then establish the connection and enable user 102 to interact with the deployed application (block 610).

Figure 7:
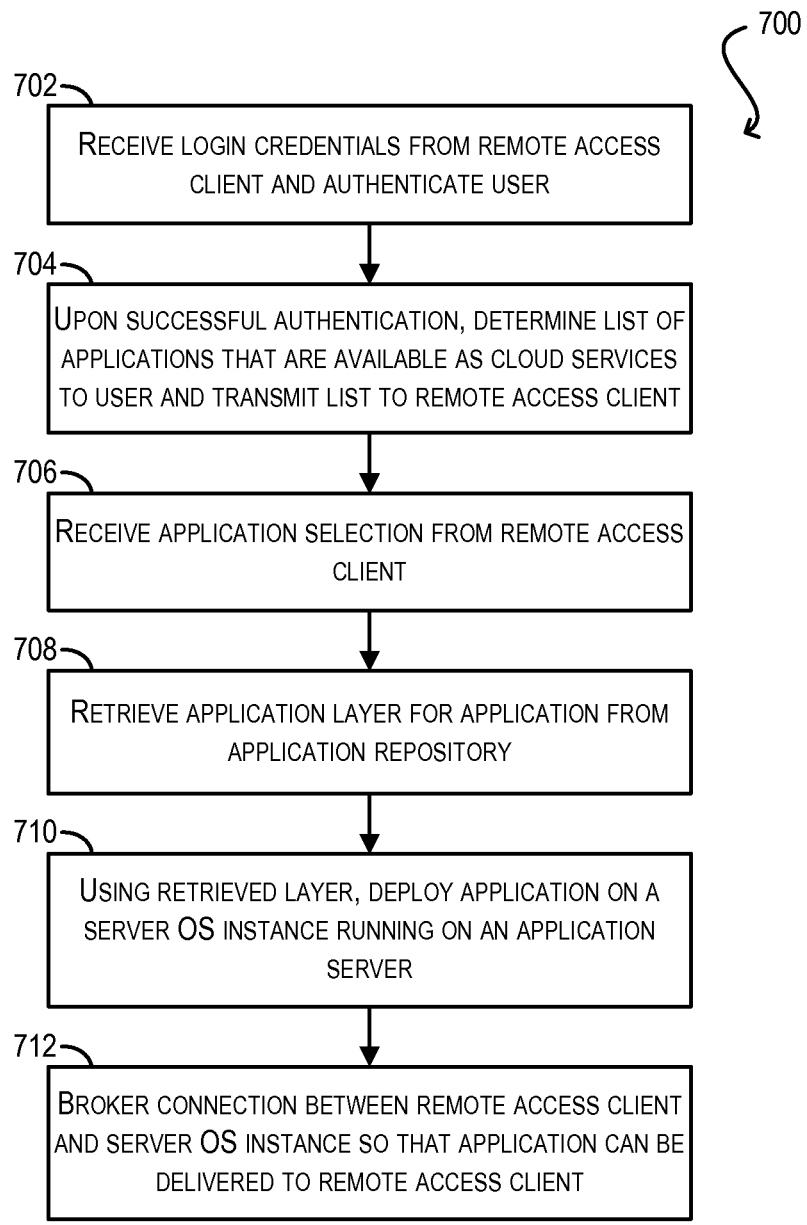
FIG. 7 depicts a flowchart performed by a server-side application delivery module according to an embodiment.

FIG. 7 depicts a flowchart 700 that may be performed by application delivery module 126 of connection server 124 as part of workflow 300 of FIG. 3 according to an embodiment. It is assumed that flowchart 700 is performed concurrently with flowchart 600 of FIG. 6.

At block 702, application delivery module 126 can receive the user login credentials forwarded by remote access client 116 at block 602 and can authenticate user 102. Upon successful authentication, application delivery module 126 can determine a list of applications that are available as cloud services to user 102 and transmit the list to remote access client 116. In a particular embodiment, this step can comprise consulting application repository 128 and identifying the applications that have been added to the cloud-accessible user workspace of user 102.

At block 706, application delivery module 126 can receive a selection of a particular application from remote access client 116. In response, application delivery module 126 can retrieve the stored application layer for the application from application repository 128 and can use the retrieved layer to deploy the application on server OS instance 312 residing on application server 122. As discussed previously, server OS instance 312 may be, e.g., a guest OS running within a persistent or non-persistent VM, or a session-based OS running on the physical hardware of application server 122.

Finally, at block 712, application delivery module 126 can broker a connection between remote access client 116 and server OS instance 312 so that the deployed application can be delivered (via the previously mentioned remote display protocol) to remote access client 116.

The embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
converting a desktop application installed on a first end-user computing device to a cloud service hosted by a server system and provided on demand to one or more users independent of native support for the application on respective end-user computing devices of the one or more users, the converting comprising:
receiving, by a server system, a representation of an application that has been extracted from an installation of the application on a first end-user computing device by a client-side conversion agent, wherein the representation is a separate application layer that provides a self-contained representation of the application and includes a collection of files and configuration information associated with the application, the configuration information including a transaction representation of registry entries comprising an ordered series of registry operations performed during installation of the application on the first end-user computing device, wherein the application layer is configured to be applied to another computing device to reproduce the application including all of its custom configurations on that computing device, and wherein the configuration information includes changes made to an application registry of an operating system of the first end-user computer recorded during installation of the application, wherein the recording includes recording a series of create, update, and delete registry operations that are performed in a particular order; and
in response to receiving the representation, processing the representation using a server-side conversation agent, the processing including storing, by the server system, the representation of the application in a server-side repository for deployment as a cloud service, wherein storing the representation of the application includes storing the application layer and metadata associated with the representation indicating one or more users to which the application is available for deployment;
making the application accessible to the one or more users including adding a user selectable identifier of the application to a cloud-accessible user workspace associated with each of the one or more users identified by the metadata; and
in response to a request to access the application, using the recording to replay the series of create, update, and delete registry operations in the same order at the server-side repository to perform the same application registry changes at an operating system of the server-side repository.

2. The method of claim 1 further comprising:
receiving, from a remote access client running on a second end-user computing device distinct from the first end-user computing device, the request to access the application as a cloud service;
retrieving the representation of the application from the server-side repository in response to the request;
deploying, using the retrieved representation, an instance of the application on a server-side operating system (OS) instance associated with a virtual machine, wherein the deploying includes using the recording to replay the ordered series of registry operations of the transaction representation to replicate the configuration of the application on the OS instance; and
causing user interface (UI) information of the deployed application instance to be delivered, via a remote display protocol, to the remote access client.

3. The method of claim 2 wherein the first end-user computing device is configured to run a first OS, wherein the second end-user computing device is configured to run a second OS, and wherein the application is incompatible with the second OS.

4. The method of claim 2 wherein the first end-user computing device is configured to include a first processor having a first architecture, wherein the second end-user computing device is configured to include a second processor having a second architecture, and wherein the application is incompatible with the second processor having the second architecture.

5. The method of claim 2, wherein deploying the instance of the application comprises applying the configuration information included in the application layer, wherein the configuration information includes a transaction representation of registry entries.

6. The method of claim 5, wherein applying the configuration information includes replaying an ordered series of create, update, and delete registry operations in the transactional representation to replicate the configuration of the application as it existed on the first end-user computing device.

7. The method of claim 1 wherein the configuration information includes a transactional representation of OS registry entries associated with the application on the first end-user computing device.

8. The method of claim 1 wherein storing the representation of the application in the server-side repository comprises storing metadata indicating that the application may be deployed as a cloud service.

9. The method of claim 1 wherein storing the representation of the application in the server-side repository comprises adding an identifier of the application to a cloud-accessible user workspace defined for a user of the first end-user computing device within the repository.

10. The method of claim 1 wherein the application is selected for conversion into a cloud service by a user or an administrator of the first end-user computing device.

11. A non-transitory computer readable storage medium having stored thereon instructions executable by one or more server computer systems, the instructions embodying a method that comprises:
converting a desktop application installed on a first end-user computing device to a cloud service hosted by a server system and provided on demand to one or more users independent of native support for the application on respective end-user computing devices of the one or more users, the converting comprising:
receiving a representation of an application that has been extracted from an installation of the application on a first end-user computing device by a client-side conversion agent, wherein the representation is a separate application layer that provides a self-contained representation of the application and includes a collection of files and configuration information associated with the application, the configuration information including a transaction representation of registry entries comprising an ordered series of registry operations performed during installation of the application on the first end-user computing device, wherein the application layer is configured to be applied to another computing device to reproduce the application including all of its custom configurations on that computing device, and wherein the configuration information includes changes made to an application registry of an operating system of the first end-user computer recorded during installation of the application, wherein the recording includes recording a series of create, update and delete registry operations that are performed in a particular order; and
in response to receiving the representation, processing the representation using a server-side conversation agent, the processing including storing the representation of the application in a server-side repository for deployment as a cloud service, wherein storing the representation of the application includes storing the application layer and metadata associated with the representation indicating one or more users to which the application is available for deployment;
making the application accessible to the one or more users including adding a user selectable identifier of the application to a cloud-accessible user workspace associated with each of the one or more users identified by the metadata; and
in response to a request to access the application, using the recording to replay the series of create, update, and delete registry operations in the same order at the server-side repository to perform the same application registry changes at an operating system of the server-side repository.

12. The non-transitory computer readable storage medium of claim 11 wherein the method further comprises:
receiving, from a remote access client running on a second end-user computing device distinct from the first end-user computing device, the request to access the application as a cloud service;
retrieving the representation of the application from the server-side repository in response to the request;
deploying, using the retrieved representation, an instance of the application on a server-side operating system (OS) instance associated with a virtual machine, wherein the deploying includes using the recording to replay the ordered series of registry operations of the transaction representation to replicate the configuration of the application on the OS instance; and
causing user interface (UI) information of the deployed application instance to be delivered, via a remote display protocol, to the remote access client.

13. The non-transitory computer readable storage medium of claim 12 wherein the first end-user computing device is configured to run a first OS, wherein the second end-user computing device is configured to run a second OS, and wherein the application is incompatible with the second OS.

14. The non-transitory computer readable storage medium of claim 12 wherein the first end-user computing device is configured to include a first processor having a first architecture, wherein the second end-user computing device is configured to include a second processor having a second architecture, and wherein the application is incompatible with the second processor having the second architecture.

15. The non-transitory computer readable storage medium of claim 11 wherein the configuration information includes a transactional representation of OS registry entries associated with the application on the first end-user computing device.

16. The non-transitory computer readable storage medium of claim 11 wherein storing the representation of the application in the server-side repository comprises storing metadata indicating that the application may be deployed as a cloud service.

17. The non-transitory computer readable storage medium of claim 11 wherein storing the representation of the application in the server-side repository comprises adding an identifier of the application to a cloud-accessible user workspace defined for a user of the first end-user computing device within the repository.

18. The non-transitory computer readable storage medium of claim 11 wherein the application is selected for conversion into a cloud service by a user or an administrator of the first end-user computing device.

19. A computer system comprising:
a processor; and
a non-transitory computer readable medium having stored thereon program code that causes the processor to, upon being executed:
convert a desktop application installed on a first end-user computing device to a cloud service hosted by a server system and provided on demand to one or more users independent of native support for the application on respective end-user computing devices of the one or more users, comprising:

receive a representation of an application that has been extracted from an installation of the application on a first end-user computing device by a client-side conversion agent, wherein the representation is a separate application layer that provides a self-contained representation of the application and includes a collection of files and configuration information associated with the application, the configuration information including a transaction representation of registry entries comprising an ordered series of registry operations performed during installation of the application on the first end-user computing device, wherein the application layer is configured to be applied to another computing device to reproduce the application including all of its custom configurations on that computing device, and wherein the configuration information includes changes made to an application registry of an operating system of the first end-user computer recorded during installation of the application, wherein the recording includes recording a series of create, update, and delete registry operations that are performed in a particular order; and in response to receiving the representation, processing the representation using a server-side conversation agent, the processing including store the representation of the application in a server-side repository for deployment as a cloud service, wherein storing the representation of the application includes storing the application layer and metadata associated with the representation indicating one or more users to which the application is available for deployment;

make the application accessible to the one or more users including adding a user selectable identifier of the application to a cloud-accessible user workspace associated with each of the one or more users identified by the metadata; and in response to a request to access the application, using the recording to replay the series of create, update, and delete registry operations in the same order at the server-side repository to perform the same application registry changes at an operating system of the server-side repository.

20. The computer system of claim 19 wherein the program code further causes the processor to:

receive, from a remote access client running on a second end-user computing device distinct from the first end-user computing device, the request to access the application as a cloud service;

retrieve the representation of the application from the server-side repository in response to the request;

deploy, using the retrieved representation, an instance of the application on a server-side operating system (OS) instance associated with a virtual machine, wherein the deploying includes using the recording to replay the ordered series of registry operations of the transaction representation to replicate the configuration of the application on the OS instance; and deliver user interface (UI) information of the deployed application instance via a remote display protocol to the remote access client.

21. The computer system of claim 20 wherein the first end-user computing device is configured to run a first OS, wherein the second end-user computing device is configured to run a second OS, and wherein the application is incompatible with the second OS.

22. The computer system of claim 20 wherein the first end-user computing device is configured to include a first processor having a first architecture, wherein the second end-user computing device is configured to include a second processor having a second architecture, and wherein the application is incompatible with the second processor having the second architecture.

23. The computer system of claim 19 wherein the configuration information includes a transactional representation of OS registry entries associated with the application on the first end-user computing device.

24. The computer system of claim 19 wherein storing the representation of the application in the server-side repository comprises storing metadata indicating that the application may be deployed as a cloud service.

25. The computer system of claim 19 wherein storing the representation of the application in the server-side repository comprises adding an identifier of the application to a cloud-accessible user workspace defined for a user of the first end-user computing device within the repository.

26. The computer system of claim 19 wherein the application is selected for conversion into a cloud service by a user or an administrator of the first end-user computing device.

* * * * *